United States Patent

[11] 3,611,299

[72] Inventors Royce D. Lindsey; William L. McDonald, both of Austin, Tex.

[21] Appl. No. 11,630

[22] Filed Feb. 16, 1970

[45] Patented Oct. 5, 1971

[73] Assignee International Business Machines Corporation Armonk, N.Y.

[54] MAGNETIC CARD DATA RECORDER
16 Claims, 8 Drawing Figs.

[52] U.S. Cl. 340/172.5

[51] Int. Cl. G06f 11/00

[50] Field of Search 340/172.5

[56] References Cited

UNITED STATES PATENTS 3,435,421 3/1969 Sharples 340/172.5

*Primary Examiner*—Gareth D. Shaw

*Attorneys*—Hanifin and Jancin and John L. Jackson

ABSTRACT: A system for use in a keypunch application. Keyed data is recorded onto a magnetic card. To prevent interruption of the keying rhythm during movement of the read-record head from track to track and during card feed, a two-sectioned memory is employed, which through selection of a single address and gated logic allows data to be transferred from one section to the other section without need of buffering or other types of temporary storage or delay. The two-sectioned single address memory is also utilized during verify and duplication operations with, in the case of the latter, the data from a first record being entered from the keyboard into the first section of memory and being transferred to the second section for transfer to the magnetic card. During duplication into a second record from the keyboard, data is transferred back into the first section from the second section through utilization of the single address technique.

INVENTORS
ROYCE D. LINDSEY
WILLIAM L. MC DONALD

ATTORNEY

MAGNETIC CARD DATA RECORDER

CROSS-REFERENCE TO RELATED APPLICATIONS

The following applications are assigned to the same assignee as the patent application.

U.S. Pat. application, Ser. No. 697,716, now U.S. Pat. No. 3,523,287, entitled "Recording and Playback System Incorporating a First Character Positioning System," D. J. Morrison et al., as inventors, filed Jan. 15, 1968.

U.S. Pat. Application, Ser. No. 697,735, now U.S. Pat. No. 3,530,448, entitled "Data Reading, Recording, and Positioning System," D. E. Clancy, et al., inventors, filed Jan. 15, 1968.

U.S. Pat. application, Ser. No. 697,717, now U.S. Pat. No. 3,524,164, entitled "Detection and Error Checking System for Binary Data," C. W. Cox, et al., inventors, filed Jan. 15, 1968.

U.S. Pat. application, Ser. No. 623,053, now abandoned for continuation Ser. No. 802,703, entitled "Data System with Printing, Composing, communications, and Magnetic Card Processing Facilities," Robert A. Kolpeck, inventor, filed Mar. 14, 1967.

U.S. Pat. application, Ser. No. 831,948, entitled "Record Card Handling Device with Feed Pass," D. R. Andrews et al., inventors, filed June 10, 1969.

U.S. Pat. application Ser. No. 861,773, entitled "Magnetic Recording Media and Device Utilizing the Same," C. K. Beck, inventor, filed Sept. 29, 1969.

BACKGROUND OF THE INVENTION

1. Field of the Invention

This invention relates to keyed data entry systems in general, and more particularly to a key data entry system in which keyed data is entered onto magnetic cards.

2. Description of the Prior Art

The utilization of punched cards for storage of records is quite old. There are a number of advantages attendant the utilization of punched cards for the storage of records. Thus, pooling of results of a number of keypunch operators can be readily facilitated. That is, for a given job a number of operators, for instance 10, can be assigned one-tenth of a job and the job completed 10 times as fast as would be the case if a single operator were keying. Since the cards are amenable to manual pooling, the results of the individual operators can then be manually pooled.

Additionally, the use of individual punched cards allows operator searching. That is, there is a correspondence between the source records and the cards and the operator can, in the event that an error is detected, roughly determine at what position in the stack the card lies by referencing to its relative position in the source record.

Many problems, however, are attendant the use of punched cards. The main problem is that, due to the slowness of the punching equipment, the operators keystroke rhythm is quite often broken during card feeding, automatic duplicating, and skipping of fields, which results in a relatively large loss of throughput. In addition, in the event that an error occurs, the entire card must be repunched. Finally, the cards themselves are quite bulky in that each individual card normally stores a single record of 80 characters.

Recently, there have been a number of attempts to overcome the problems attendant the use of punched card systems. These efforts have by and large been directed toward providing a system in which keyed data is entered directly onto a magnetic tape which ideally can then be entered directly into a computer. In actual practice, however, there have been a number of problems associated with the entry of information keyed onto a computer tape directly into a computer. The main problem is that where a number of operators are doing a particular job, their work which is entered onto individual tapes, must be pooled prior to being fed into the computer; otherwise, there would be too much requisite computer tape changing with a resultant overall inefficient use of the computer. While off-line poolers are now available, there is still the problem that for the average job the amount of magnetic tape used by an operator is less than ten percent of the overall total amount of tape available. There is therefore a great inefficiency in the use of the magnetic tapes, with a consequent requirement of a large number of spare tapes at any keying facility. Another shortcoming which has been encountered is that of locating a record for correction. As previously indicated, when punched cards are used the operator can, by referring to the source document, fairly accurately locate the card which corresponds to the problem card or error card and can then go directly to the stack and retrieve this card. When recording onto a magnetic tape, however, this is impossible and a complete search of the recorded data is necessary. This search is quite often relatively time consuming depending upon the amount of information which is contained on the tape. Thus, a more efficient utilization of the magnetic tape, i.e., the more information that is placed on the tape, results in a greater amount of search time during error correction procedures.

Another problem associated with present day key-to-tape units is that of interruption of operator keying rhythm. Thus, in certain situations the system itself is not fast enough to prevent the locking up of the keyboard or indicating to the operator that data cannot be keyed pending movement of the tape. That is, in entry, following completion of keying of one record, the record must be recorded on tape, the tape backed up one block, and the block checked before the next record can be entered. Also, during the verification mode of operation when corrections have been made in the record, the system must back the tape up to the beginning of the record, then re-record the record back onto the tape, back the tape up and then check/read the corrected record before reading in the next record to be verified. During this re-recording of the record and repositioning of the tape to the following record and reading of the following record, the keyboard must be locked up or entry of additional data be otherwise inhibited since no provision is made for allowing the operator to continue keying data to be verified prior to the repositioning of the magnetic head over the second record and reading of the second record into the buffer.

SUMMARY OF INVENTION

Briefly, there is provided a system for use in keyboard-type applications in which data keyed by an operator is entered into a first register or storage area in a memory until a complete record has been entered. At the completion of the entering of a complete record, the operator keys an end of record entry or the end of record is entered under program control and this end of record entry causes the XY-address lines of the memory to be brought up in both the first section of the memory and a second section of the memory and logical gating causes the contents of the first section of the memory to be gated into the identical address positions of the second section of the memory. The contents of the second section of the memory are then transferred by means of a read-record unit onto a magnetic card with one complete record corresponding to one track on the card. While the first record from the second section of memory is being transferred to the magnetic card, the operator can key a second record into the first section of memory. This process continues during the entry mode.

During the verification mode data is first read from the magnetic card into the first section of memory. Verification data is entered at the keyboard and compared with the data in the first section of the memory. Upon successful verification of the data in the first section of memory, a verification mark is entered following the data and the data in the first section of memory is transferred into the second section of memory as in the entry mode. When this is completed, the next record to be verified is read into the first section of memory and the operator can begin verification without interruption. The reader-recorder head is then repositioned to the proper card track and the first record is transferred from the second section of memory to the card. If a dup-verify field is entered or the operator depresses the dup key, the XY-drivers of the memory are then brought up and a simple compare, character by character, is made between the characters held in the first and second sections of memory through the end of the field.

During duplication in the entry mode, a record is entered from the keyboard into the first section of memory and transferred to the second section of memory and for the portions of the record which are to be duplicated from the second section of the memory, a transfer is made from the second section back up to the first section.

The transfer of data from one section of the memory to the other section of memory facilitates an overlap of operation between the keyboard and the reader-recorder in the entry and verification modes and duplication function and allows an efficient use of the system, in that only one XY-address is necessary for each of the shifts between sections in the memory and due to the rapidity and overlap of the operation, uninterrupted operator keying rhythm is assured.

DETAILED DESCRIPTION OF THE DRAWINGS

Figure 1:
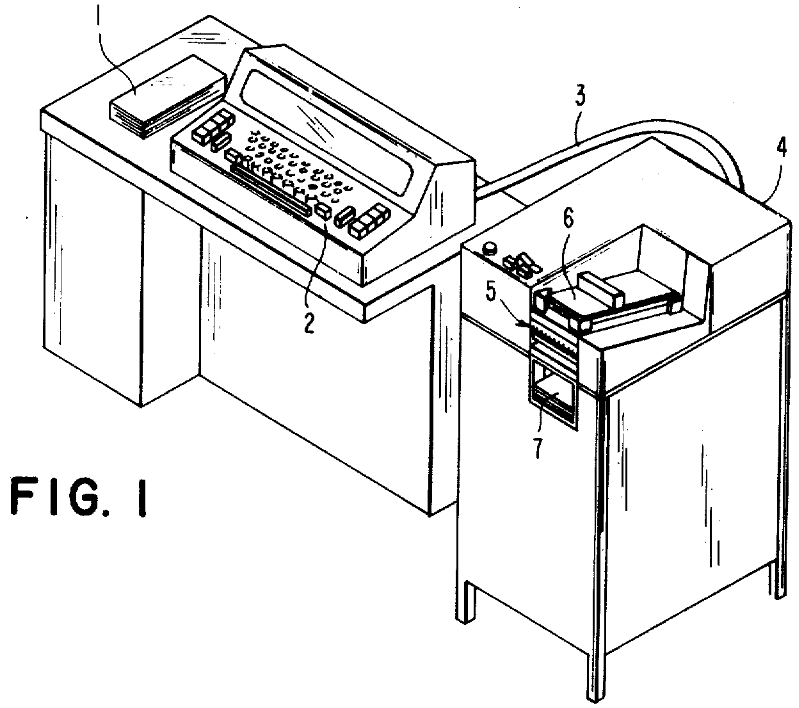
FIG. 1 is a drawing showing the overall system including a keyboard unit, a control console, and a magnetic card pack feed reader-recorder.

For a more detailed description of the subject novel system, refer first to FIG. 1 which illustrates the complete system. As shown in FIG. 1, an operator worktable 1 is physically attached to a key entry terminal 2, which in turn is electrically connected by means of cable 3 to a console unit 4 which includes a card hopper generally designated as 5. The card hopper includes a stack of cards 6 which are to be read or recorded on. Also shown is a stack of cards 7, which have been processed.

The magnetic cards contained in the card unit 5 are ideally of the type as described in the aforementioned Beck application. As discussed in that application, the cards have a magnetic oxide on one side thereof and a conductive backing on the other side thereof to alleviate static problems during high speed feeding. Further, as discussed in U. S. Pat. application, Ser. No. 831,948, referred to above, each of the cards in stack 6 may be automatically fed into a read/write unit and in the read/write unit have information recorded track by track or information read therefrom track by track, and following processing, automatically fed to stack 7. The aforementioned Kolpeck application provides an alternate but not preferred system which may be utilized in the present invention, in which a single magnetic card can be manually inserted into the card transport for the transducement of information and thereafter it is partially ejected from the card transport for operator removal.

With respect to the feeding of the magnetic card into the unit for transducing of information, this mechanism is described in detail in the aforementioned Morrison et al., application. As described in that application, the magnetic recording transducer is stationary along the long axis of the card and the card is moved back and forth so that tracks may be recorded on it. The only movement of the magnetic transducer is from track to track along the short length of the card. A detailed description of the recording and reading operation is included in the aforereferenced copending application of Clancy, et al., and a detailed description of the reproducing operation is found in the aforereferenced Cox, et al., application.

Basically, with respect to the system of FIG. 1 an operator enters keyed data through use of keyboard 2 and electrical codes representative of this data are fed along cable 3 into the console 4 which affects automatic recording of the information track by track on the cards.

In the preferred embodiment, each of the tracks of information recorded on the cards for purposes of simplicity are made to correspond to a record of data such as is included on a conventional punched card; except 96 characters can be recorded on each track of the card, as opposed to 80 characters on a punched card. When a card is completely filled with 50 tracks, it is automatically fed into stack 7 and a new card is entered into the transducing and reproducing area. Through use of the system illustrated in FIG. 1, the operator can enter data by means of keyboard 2 and have this data continuously recorded on the magnetic cards, and in the event that an error is detected, can correct the error on the magnetic card without repunching the entire record. The keying by the operator is independent of any lag time required for the feeding of the cards in the console 4 or movement of the head relative to the cards. This is because of a unique data flow and associated memory organization in the system.

Figure 2:
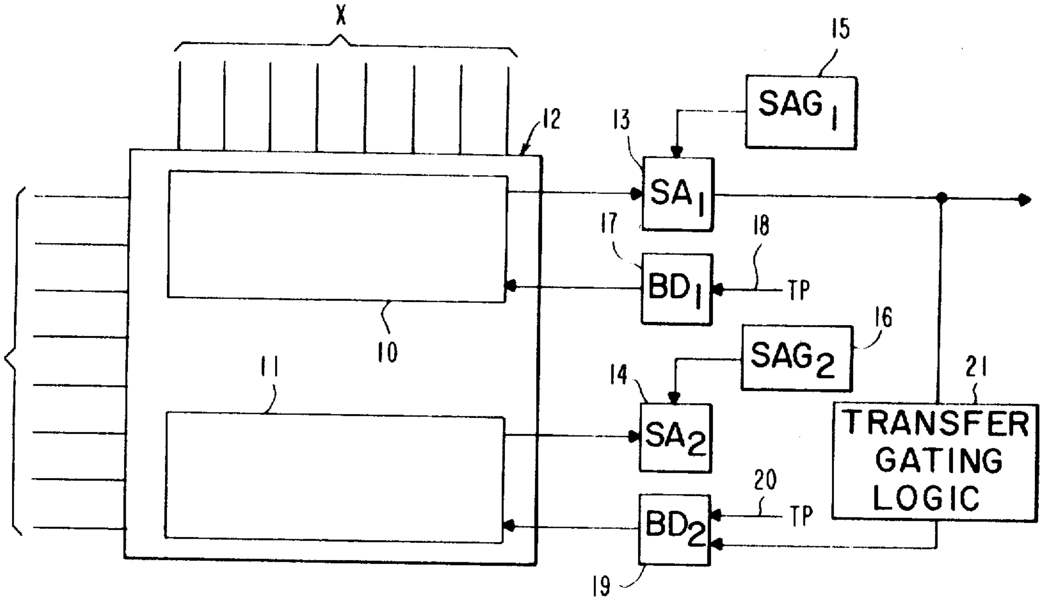
FIG. 2 is a drawing of one portion of the memory employed in the subject novel system which is illustrative of the technique of utilizing a single address to cause transfer of data between identical sections of the memory.

For a further discussion of the system, along with the data flow, refer next to FIG. 2 wherein is shown a small portion of the memory. This figure illustrates the memory organization technique which allows rapid and efficient handling of the data in the system which results in unbroken keying rhythm by the operator even during periods of head movement and card feeding. As shown in FIG. 2, there are two monolithic memory chips 10 and 11 on a module illustrated generally at 12. This is a conventional monolithic memory module. As further shown in FIG. 2, in conventional notation, each of the areas in the memory can be addressed by selecting one of eight X-lines and one of eight Y-lines. Thus, the memory illustrated in FIG. 2 has 128 bit capacity. As further shown in FIG. 2, connected to chip 10 is a sense amplifier 13 which is gated by means of a sense amplifier gate 15. The sense amplifier and sense amplifier gates associated with chip 10 have a subscript 1. Also electrically to chip 10 is a bit driver 17 which receives a pulse designated the timing pulse along line 18. In like manner, there is electrically connected to chip 11 a sense amplifier 14, sense amplifier gate 16, having as shown a subscript 2. Likewise, connected to chip 11 is a bit driver 19 which receives a timing pulse along line 20. Further, as shown in FIG. 2 the output of the sense amplifier is applied through a transfer control unit 21 and to the bit driver 19.

In operation to write a bit into a memory location, the appropriate logical level is applied to the selected X- and Y-lines and the timing pulse is then applied through either bit driver 1 or bit driver 2. This will cause a one or zero to be written into the selected memory location determined by the polarity of the bit driver input.

In operation, to read a bit the addressed X- and Y-lines are brought up and the sense amplifier energized by means of the appropriate gate. Thus, in the event that a bit is to be read which is contained in chip 10, sense amplifier 13 and sense amplifier gate 15 would be utilized to provide an output at the output of the sense amplifier. To write a bit in a location, the addressed lines are brought up and a timing pulse applied to the appropriate bit driver.

As previously discussed, one of the techniques which is utilized in the subject system, which facilitates the efficient and novel data flow utilized, is the manipulation of the memory portions of the system to allow transfer of data back and forth between the two sections with the selection of a single address. While the overall memory layout will not be delved into in detail, a brief discussion will be given to illustrate how this is accomplished. Refer again to FIG. 2. As illustrated in FIG. 2, there are eight X-lines and eight Y-lines associated with each of the chips 10 and 11. Thus, a single address makes two bit positions available. That is, during reading, a single address causes a two bit word to be read. In the subject technique, means are provided for reading from one chip into the corresponding address in the other to accomplish transfer of data from one chip to the other in one memory cycle. As shown in connection with FIG. 3, the writing of a bit from chip 10 into chip 11 can be accomplished by bringing up the selected X- and Y-lines for each of the chips, and energizing sense amplifier 1 by means of sense amplifier gate 1 to provide an output into transfer control gate 21. If the gate 21 is on, the output from the selected bit position in chip 10 is applied to bit driver 2. Application of a timing pulse to bit driver 2 will cause the bit or contents from chip 10 to be written into the selected bit position in chip 11.

While the transfer of only a single bit was described in connection with FIG. 2, it will be obvious that an entire record or any selected portion thereof can be transferred in parallel from one section of the memory to the other. Additionally, while for purposes of simplicity of description, the only description was that of writing from chip 10 into chip 11, it will be obvious that the data flow could be from chip 11 into chip 10.

Figures 3, 4:
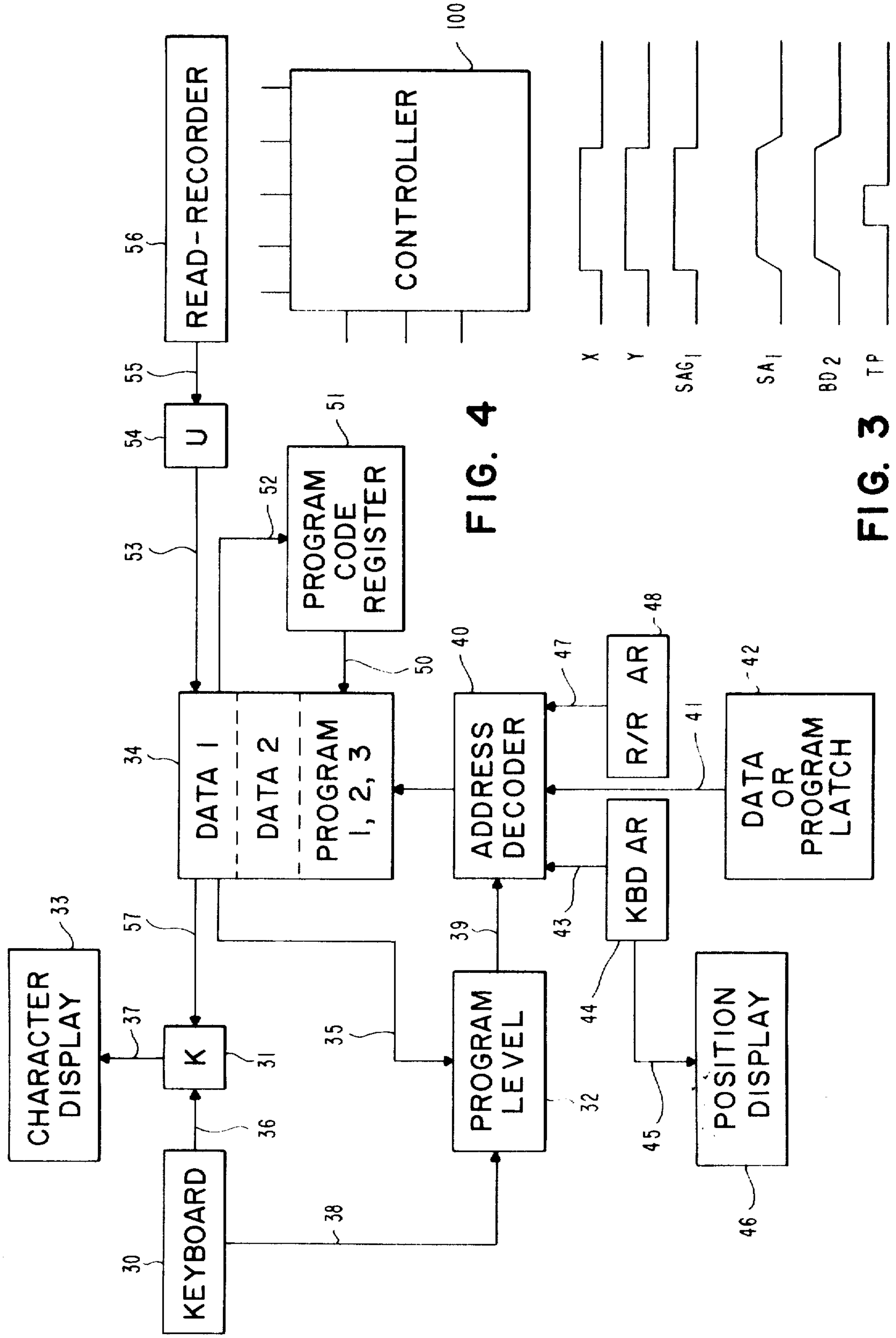
FIG. 3 are waveforms illustrative of the timing employed in the memory section illustrated in FIG. 2.
FIG. 4 is a block diagram illustrating the data flow during the program load-read portion of the system.

As shown in FIG. 3, the timing employed to accomplish the writing of a bit from chip 10 into chip 11 is illustrated. As shown, both the X- and Y-drivers and the sense amplifier gate are brought up, which then results in an output from sense amplifier 1 and an input through the transfer unit 21 into bit driver 2 which remains up at the time that the timing pulse is applied to cause the bit to be written into chip 11.

As will hereinafter later become apparent in connection with the ensuing discussion, the subject system is a programmed field system. That is, programs are loaded into a portion of the memory and these programs control the formatting of the information. For example, certain typical functions may be programmed as follows:

| Type of Field | Keyboard Select | Program Code |
|---|---|---|
| Manual Numeric | 1 | 0001 |
| Manual Alpha | 2 | 0010 |
| Auto Dup—Numeric | 3 | 0100 |
| Auto Dup—Alpha | 4 | 0111 |
| Auto Skip | 5 | 0110 |
| Left—Zero Fill | 6 | 0000 |
| Manual Numeric, NonVerify | U | 1001 |
| Manual Alpha, NonVerify | I | 1010 |
| Left-Zero, NonVerify | L | 1000 |

As illustrated in FIG. 4, the system is designed to accommodate three different programs. Each program is identified by 1, 2, or 3, and is referred to as a program level. The programs are initially prepared by the operator depressing the keys on the keyboard. The desired functions may be coded as shown in the above chart for the first position of a field, entering spaces for the following positions in a field. There must be a program code recorded in each of the positions in the program record and after the last program code is recorded, a record end code must be recorded. After the three programs have been prepared, they are read into the memory portion of the system. There is no entering of the program codes into the memory directly from the keyboard. Instead, the program codes are recorded onto a program card which is then read into memory. This is done so that the program can be verified prior to storage in memory. Verification of the program is accomplished in the same manner as data connection with FIG. 6. However, to facilitate the present discussion, it is assumed that the card has been verified and it is to be read into memory.

In FIG. 4 is shown a system and data flow utilized during the program load-read sequence. As shown in FIG. 4 there is a controller 100 associated with the system which controls the data flow in accordance with the following discussion. The specific connection of the lines, gating, and timing will not be provided since this is considered to be within the skill and art of the average systems engineer. Additionally, the programming of a general purpose computer to provide the hereinafter described data flow is well within the state of the art and therefore, programming details, other than data flow, will not be discussed. As shown in FIG. 4, there is keyboard 30 which is connected to a K-register 31 and to a program level register 32. Connected to the K-register 31 is a character display 33. The function of the character display is to display the character which is contained in register 31. Register 31 is a one character register which receives characters either from the keyboard 30 or from the data 1 portion of the memory 34. The specific decoding and generation of the character contained in the character register 31 will not be discussed since there are a number of ways of providing a character display. As shown in FIG. 4, the data 1 portion of the memory is also connected to the program level register by means of line 35 which in turn is connected along line 39 to address decoder 40. The address decoder 40 functions in a conventional manner to hold and decode an address to cause the selected area of the memory 34 to be made available. Connected to the address decoder 40 along line 41 is a data or program latch 42 which functions merely to cause either the data portion of the memory to be addressed or the program portion of the memory to be addressed under control of controller 100.

The addressing scheme employed with memory 34 is similar to that discussed in connection with FIG. 2, in which data from data portion 1 can be transferred to data portion 2 and vice versa merely by selecting a single address and loading the address into the address decoder 40. Connected to the address decoder 40 along line 43 is a keyboard address register 44, which likewise is connected along line 45 to a position display 46. The position display 46 merely displays the position of the record into which data is to be written. Thus, the position display will display a number of 1 through 96 indicating the position of the character which is to be written or which is being addressed by means of the address decoder 40. Also connected to the address decoder 40 along line 47 is a read/write address register 48. Again, the read/write address register 48 controls or selects the address into which data is to be written from the reader-recorder or from which data is to be read into the reader-recorder from memory. The same is true with respect to the keyboard address register which holds the position of memory into which data from the keyboard is to be entered.

Shown connected to the program portion of the memory 34 along line 50 is a program code register which corresponds to the conventional computer operation register. Connected to the program code register 51 along line 52 is the data 1 portion of the memory. Connected to the data 1 position of the memory along 53 is a one character register 54 which is designated a U-register. The U-register 54 receives an input along line 55 from the read-record unit 56 which includes the magnetic card transducers and appropriate amplifiers.

To load the previously prepared program card with its three programs into memory, the operator selects the program load mode at the keyboard which sets up the path between the reader-recorder 56 through the one character register 54 into data 1. The track containing the first program is read into data 1. The reason that the U-register is provided is that, as discussed in the aforereferenced applications, data from the reader-recorder from the card comes in serially by bit and rather than interrupting or trying to load the data into memory by bit, since the memory is essentially a parallel by bit memory structure, seven bits are read into the U-register and loaded in a parallel manner into D1. After the complete track has been read into D1, the last character is interrogated to assure that the program has been verified. If so, the data is read into the program code register 51 and then transferred into its appropriate program section in memory. The program level was indicated by the first code on the track and this first character then causes the appropriate program level to be entered along line 35 into the program level register which causes the address decoder 40 to select the correct address in memory. The data then is fed along line 52 through the program code register 51 into the program portion of the memory. It should be noted that the operator can check the program codes recorded on the card since a path is provided along line 57 into the K-register 31.

As previously discussed, the addressing for the 96 data positions in memory can come from either the keyboard address register or a reader-recorder address register. As will later be discussed, there is an overlap between data being entered from the keyboard and data being recorded in the reader-recorder during the entry mode. With respect to the registers, the keyboard always has control of the memory address register until an interruption is received from the reader-recorder.

Figure 5:
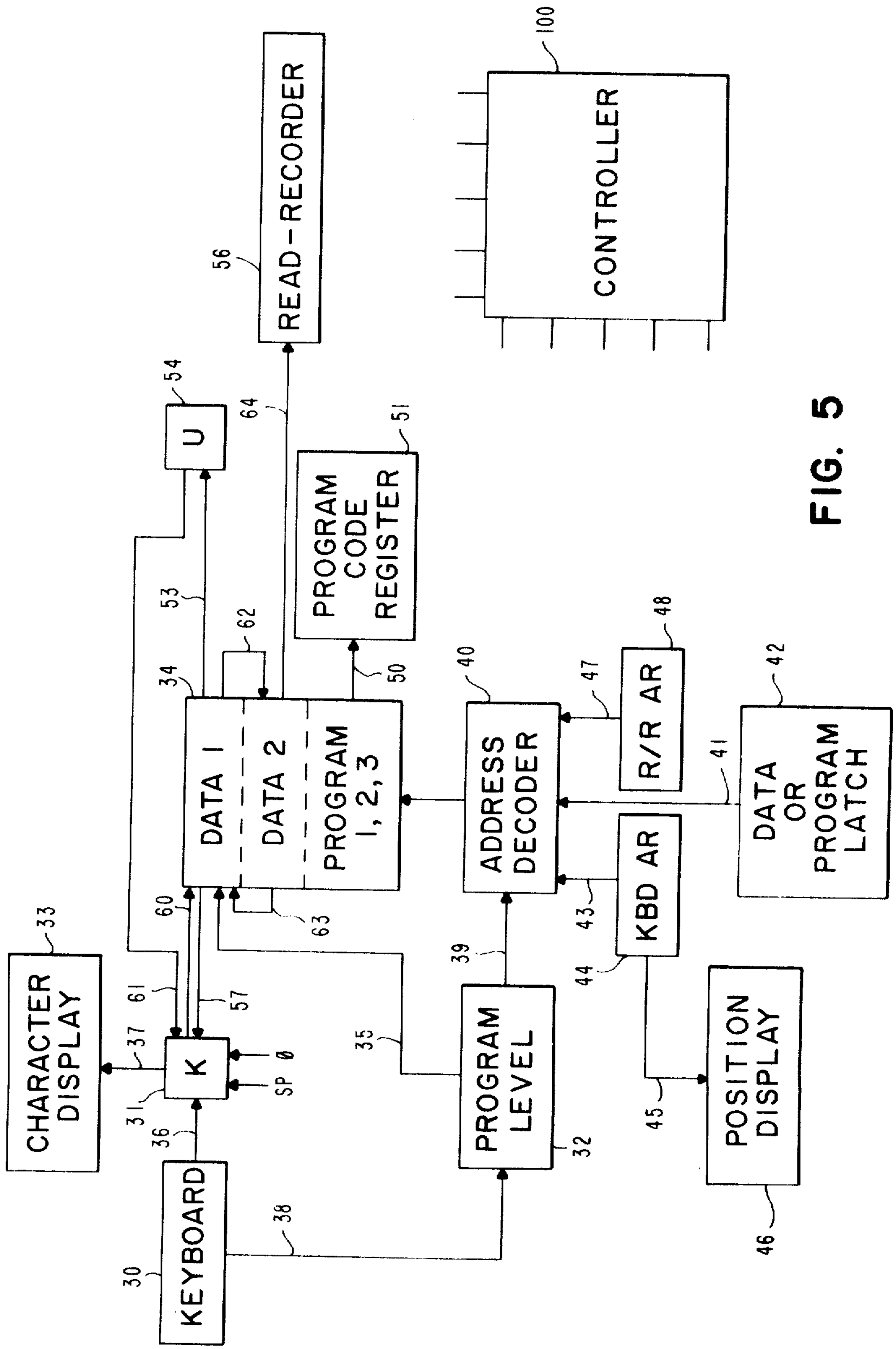
FIG. 5 is a block diagram illustrating the data flow during the entry mode of the subject system.

For a description of the data flow during the entry mode in which data is being keyed in or entered onto a magnetic card, refer next to FIG. 5. As shown in FIG. 5 and subsequent figures, common numbering similar to that employed in FIG. 4 is utilized. The only additional numbers are where new data paths are set up. As shown in FIG. 5, data is entered by the operator at the keyboard 30 and moves along line 36 through the K-register 31 along line 60 into D1. The fields which will be formed for each record are controlled by the controlling program which has, as described in connection with FIG. 4, previously been entered into the program portion of the memory 34. Assume, for purposes of illustration, that a manual field in which the operator must key data into each position of the record has been selected. In this case, the operator would continue keying data along line 60 into the data 1 portion of memory 34 until the complete record has been keyed in and would then strike an end of record key which would cause the data, as previously explained in connection with the memory description of FIG. 2 to pass from data 1 into data 2. This data path is illustrated by line 62.

The operator, during the entry mode, selects at the keyboard the particular program desired and this selection is fed along line 38 into the program level register 32 which is operative along with the address decoder 40 and the data or program latch 42 to address that program in memory which was selected by the operator at the keyboard. An indication of the program selected by the operator is fed along line 35 and is recorded in data 1 in the first character position of the record. As shown in FIG. 5, the program code is read from the memory along line 50 into the program code register 51, which as previously mentioned, is equivalent to an operation register in normal computer notation. It is this code which the controller then recognizes and utilizes to set up the appropriate data paths to accomplish the flow of data in accordance with the program code.

Following transfer of the keyed data from data 1 into data 2, the operator can then begin keying another record which is entering into data 1. Simultaneously with the keying of the second record, the data is read from data 2 along line 64 into the reader-recorder 56 and is recorded on a track of the magnetic card. Shown associated with the reader-recorder 56 is an arrow labeled delete code.

Assume for purposes of further illustration, that following a manual keying sequence a program code is read which indicates that a skip field is to be entered into. In this event a space is forced into the K-register and this space is loaded into D1 along line 60 as illustrated. This K to D1 path is maintained without having to provide a separate path from the keyboard into D1. In the event that a dup field is entered, as indicated by a program code, or the operator hits a dup key, data must be transferred from D2 to D1. This, again, is accomplished by bringing up the appropriate XY-lines and setting up the transfer, as discussed in connection with FIG. 2 to cause data to flow as indicated by line 63 from data 2 to data 1. If a left zero field is entered, two registers are required to accomplish the so-called right justification. After the significant data has been loaded into D1, the operator depresses the left zero key and the data is shifted to the right in D1 and zeros are inserted in the K-register. There is a circulating path from the K-register 31 to D1 to the U-register 54 along line 61 back to the K-register 31, in order to shift ripple all of the data down to the end of the left zero field of D1.

Figure 6:
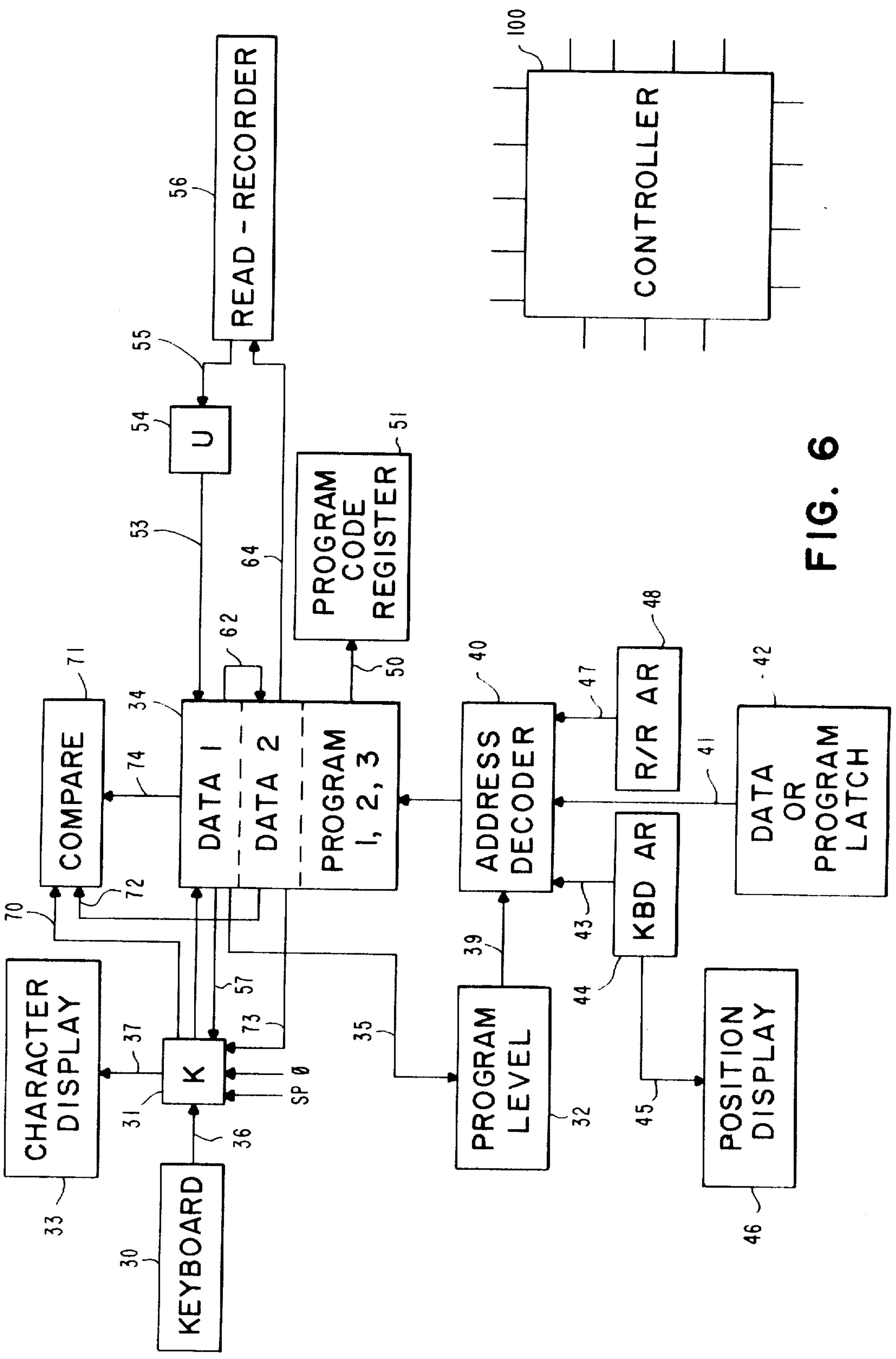
FIG. 6 is a block diagram illustrating the data flow during the verify mode of the subject system.

Refer next to FIG. 6 which illustrates the data flow during the verify mode. A track is first read from the reader-recorder 56 through the U-register along line 53 into the data 1 portion of the memory 34. After that record has been loaded into data 1, the operator rekeys the data and as it is rekeyed, it is loaded into the K-register character by character. A comparison circuit 71 sequentially compares the characters in D1 with those in the K-register. As long as they match, the operation continues through the manual fields. In the event that a character does not match, the character may be recorded correctly by means of the keyboard. If a dup field or if the dup key is depressed, then the position in data 1 is to be compared with the corresponding position in data 2. This is accomplished by selecting the address and comparing D1 and D2 throughout the field sequentially character by character. Again, errors can be recorded over by means of the keyboard. If a skip field is encountered or if the skip key is depressed, comparison is to be made with the data in D1 with a space so that to accomplish this, a space is forced into the K-register and then a compare is made with K and the particular character in data 1. In the event that the left zero mode of operation or field is encountered, which dictates that all high order zeros must be verified prior to stopping at the first nonzero character, this is accomplished by forcing a zero into the K-register and comparing K to D1. As long as a compare results, a 1 will be added to the keyboard address register until there is not a match and then the automatic sequence is terminated pending the keyboard entry. As with respect to the other modes of operation, keyboard entries can be displayed at any time by the character display.

As further shown in FIG. 6, there is a path from D1 to K which essentially allows backspacing within a record, backspacing of a character or field, and display of what is in that position. At the completion of verifying the record, the record mark is changed to a verify mark and is transferred from data 1 to data 2 to be recorded back onto the track on the magnetic card contained in reader-recorder 56. To prevent interrupting the operator, as soon as the operator finishes the record in data 1, D1 is transferred to D2 and the reader-recorder starts reading in the next record into data 1. The operator then begins verifying using the data flow paths previously discussed under control of the keyboard address register. The reader-recorder, at the completion of reading the next record in, has repositioned its transducer over the appropriate track and is recording data in D2 under control of the reader-recorder address register 48. As previously discussed, since the program is being utilized there is a data flow path from the program portion of the memory along line 50 into the program code register. Again, as a new field is encountered, the code representing the function to be performed is loaded into the program control register and controls the operation of the system. Since during preparation of the record which had been previously recorded, a program level was recorded in the first character position on the track, this program level is read from data 1 along line 35 into the program level register 32 and is used to control the address decoder 40 to pass the first character in the selected program into the program control register 51.

Figure 7:
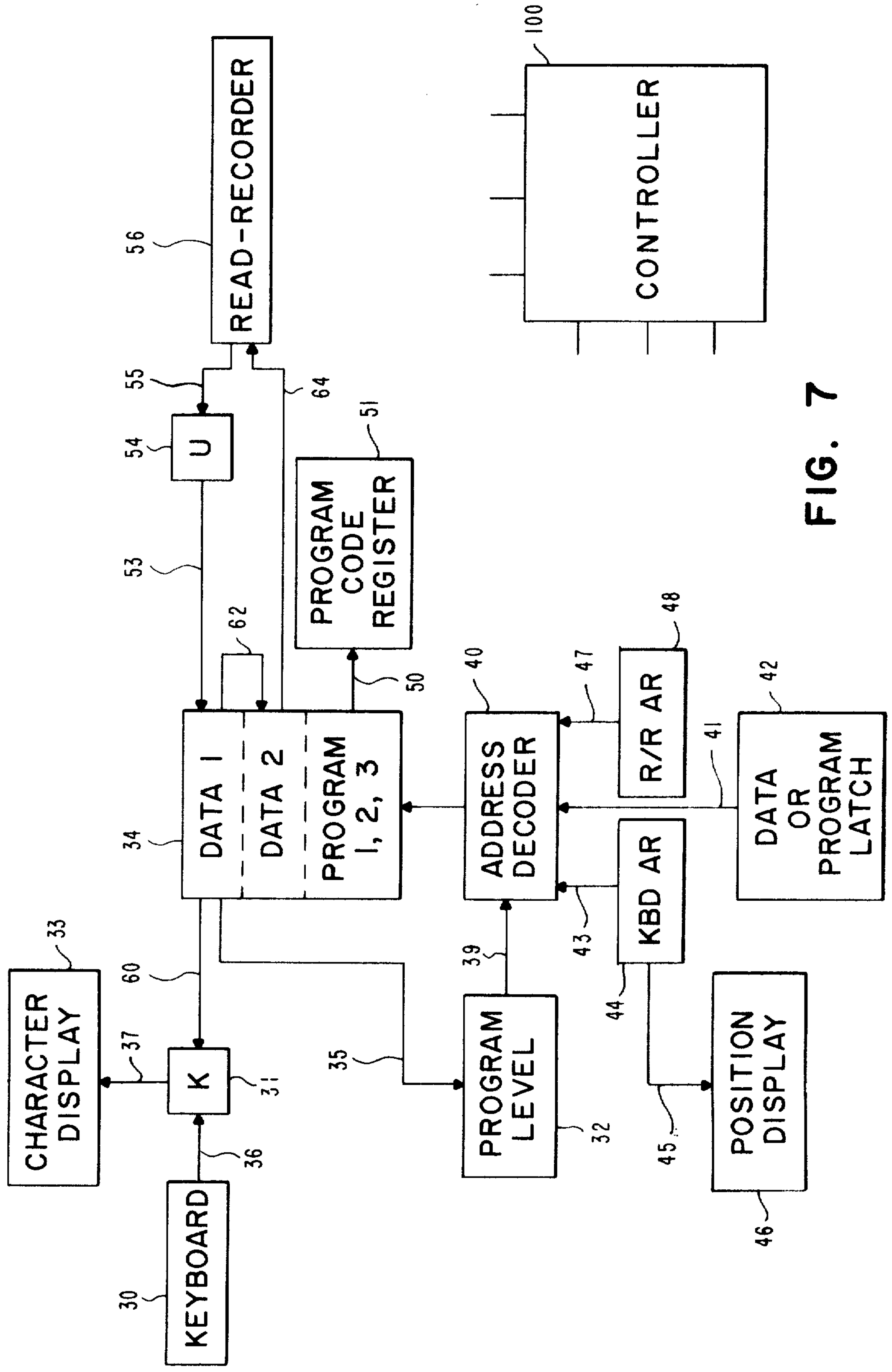
FIG. 7 is a block diagram illustrating the data flow during the read mode of the subject system.

Refer next to FIG. 7 wherein is illustrated the data flow of the system during the read mode. As illustrated in FIG. 3, the primary concern during the read mode is to allow the operator to determine what has been recorded on the card. A track is read from the card through the U-register into D1 and then under control of the keyboard, the contents of D1 can be transferred sequentially character by character into the K-register and be displayed. As further illustrated in FIG. 3, a program level that has been recorded on the card is automatically read from D1 into the program level register and used to control the address decoder 40. Normally, these are the only data paths that are utilized during the read mode of operation. In the event that a correction is to be made to a card, the operator determines the position where the corrected character is to be entered and changes the data in that character by going into the entry mode and then transfers back to the read mode. Since the record has been changed, it must be re-recorded on the card. Therefore, when the end of the record is reached, the data is transferred from data 1 to data 2, the next track is read into data 1, and the previous track is re-recorded with the changed record into the reader-recorder. As above indicated, this only occurs in a re-record or correction situation.

Figure 8:
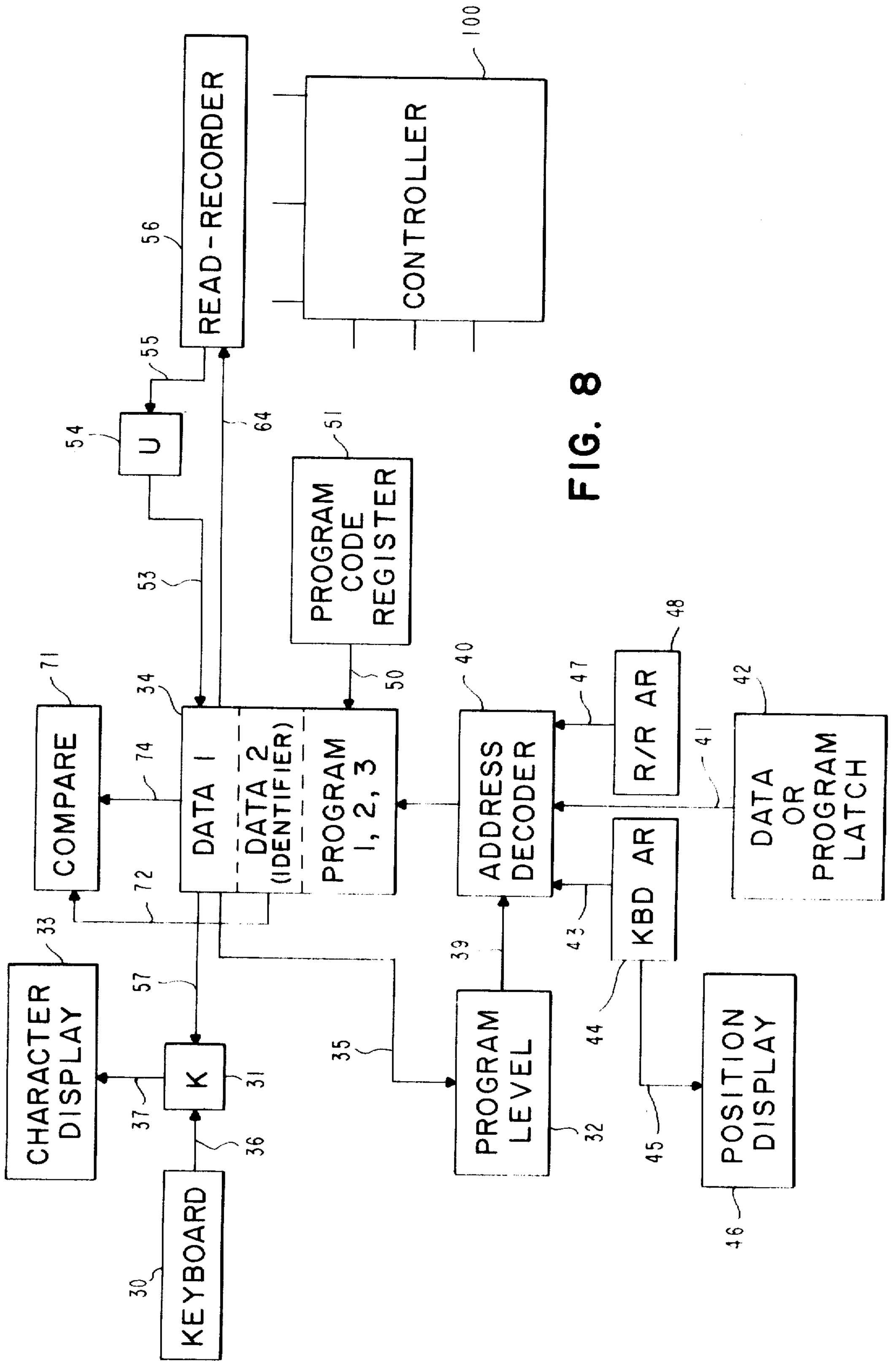
FIG. 8 is a block diagram illustrating the data flow during the search mode of the subject system.

Refer next to FIG. 8 which illustrates the data flow during the search mode. In the search mode, a stack of magnetic cards in the reader-recorder are searched against a specific identifier. The identifier is loaded into data 1 and then transferred into data 2. This is accomplished by loading spaces in all portions of the record which are not germane to the search and search criteria into the other character positions of the record. The end of record mark is then recorded which then causes transfer of data into data 2. The cards contained in the reader-recorder are read record by record and transferred character by character through U into data 1, as was described in connection with the read mode of operation. As each character is read into data 1, a sequential comparison of the characters in data 1 and data 2 is made in the compare unit. In the event that a space code is contained in the identifier, no action is indicated since this is a don't care situation. However, if data 2 is not a space and data 2 and data 1 do not compare, this indicates the lack of a match. On the occurrence of a mismatch, the search mode with respect to this track is terminated and the next track is entered into. Anytime an end of record is read and all the records have matched which do not have a space in the identifier, the card reader is stopped and the matched record in data 1 can then be displayed in the character display through register K. As further shown in FIG. 8, there is a data path out of D1 to the reader-recorder. This is provided to allow, when a matched record is found, the data to be read and changed by entry into the entry mode. Then reentry is made into the search mode without destroying the identifier in data 2.

In summary, there is provided a system for use in keyboard 30 type applications in which data keyed by an operator is entered into a first register Data 1 or storage area in a memory until a complete record has been entered. At the completion of the entering of a complete record, the operator keys an end of record entry and this end of record entry causes the XY-address lines of the memory 34 to be brought up in both the first section Data 1 of the memory and a second section Data 2 of the memory and logical gating 21 causes the contents of the first section of the memory to be gated into the identical address positions of the second section of the memory. The contents of the second section of the memory are then transferred by means of a read-record unit 56 onto a magnetic card with one complete record corresponding to one track on the card. While the first record from the second section of memory is being transferred to the magnetic card, the operator can key a second record into the first section of memory. This process continues during the entry mode. During the verification mode data is read from the magnetic card into the first section of memory. Verification data is entered at the keyboard 30 and compared (71) with the first section of the memory. Data which is common between records is dup-verified by bringing up the XY-drivers of the memory and making a simple compare. In the event that a compare is made a verification bit is recorded on the magnetic card.

During duplication a record is entered from the keyboard into the first section of memory and transferred to the second section of memory and for the portions of the record which are to be duplicated from the second section of the memory, a transfer is made from the second section back up to the first section.

The transfer of data from one section of the memory to the other section of memory facilitates an overlap of operation in the entry, verification and duplication modes and allows an efficient use of the system, in that only one YX-address (and thus one memory cycle) is necessary for each of the shifts between sections in the memory and due to the rapidity and overlap of the operation, uninterrupted operator keying rhythm is assured.

While the invention has been particularly shown and described with reference to several embodiments, it will be understood by those skilled in the art that various changes in form and detail may be made without department from the spirit and scope of the invention.

What is claimed is:

1. A data processing system wherein records of data and control functions are keyed into a keyboard which provides coded indicia of the keyed data and control functions, said system comprising:

first and second temporary storage means, means for entering said coded indicia records into said first temporary storage means from said keyboard, means for transferring said records from said first temporary storage means to said second temporary storage means, a magnetic card read-recorder operative to record said records on a magnetic card and read records therefrom, and means for transferring said records from said second temporary storage means to said magnetic card read-recorder for recording on said magnetic card.

2. The system of claim 1 wherein said means for transferring records from said first temporary storage means to said second temporary storage means includes a single address decoder and transfer gating means operative during a single memory cycle to effect said transfer.

3. The system of claim 2 wherein said first temporary storage means is cleared for accepting new keyed data upon the completion of a keyed record.

4. The system of claim 3 further including means for transferring portions of said records contained in said second temporary storage means to said first temporary storage means during a single memory cycle under control of said single address decoder and said transfer gating means.

5. The system of claim 1 further including means for reading said records recorded on said magnetic card into said first temporary storage means, a single character register, and means for comparing verification data keyed into said single character register with data in said first temporary storage means character by character.

6. The system of claim 4 further including means for reading said records recorded on said magnetic card into said first temporary storage means, a single character register, and means for comparing verification data keyed into said single character register with data in said first temporary storage means character by character.

7. The system of claim 4 further including program storage means for storing therein program control codes operative to format data entered into said first temporary storage means.

8. The system of claim 7 wherein there is recorded in said program storage means a program control code for each character position in said first temporary storage means which said program control codes are sequentially called out from storage in one for one correspondence with said keyboard entries.

9. The system of claim 8 wherein there are a plurality of program levels each including a program control code for each character position in said first temporary storage means and said program levels can be selected from said keyboard or from said first temporary storage means.

10. A data processing method wherein records of data and control functions are keyed into a keyboard which provides coded indicia of the keyed data and control functions, said method comprising:

recording a first coded indicia record into a first section of memory and upon the occurrence of an end of record transferring said first record into a second section of memory, and recording said first record from said second section of memory onto a magnetic card while a second record is keyed into said first section of memory.

11. The data processing method of claim 10 wherein transfer of records from said first section of memory to said second section of memory is accomplished in one memory cycle through use of a single address decoder and transfer logic connecting said two sections of memory.

12. The data processing method of claim 10 wherein only a portion of a record is keyed into said first section of memory and the remainder of said record is transferred from said second record to said first record and the complete record then transferred from said first section of memory to said second section of memory for recording on said magnetic card.

13. The data processing method of claim 12 wherein said transfer between said first and second sections of memory is accomplished in a single memory cycle through use of a single address decoder and transfer logic connecting said two sections of memory.

14. The data processing system of claim 10 wherein for data verification data to be verified is read from said magnetic card into said first section of memory and the verification data is entered one character at a time into a single character register and a character by character comparison made between said characters entered into said single character register and said data to be verified.

15. The data processing method of claim 14 wherein said transfer between said first and second sections of memory is accomplished in a single memory cycle through use of a single address decoder and transfer logic connecting said two sections of memory.

16. The data processing method of claim 15 wherein said data entered into said first temporary storage means is formatted in accordance with stored program codes.